United States Patent
Kwon et al.

(10) Patent No.: US 8,970,513 B2
(45) Date of Patent: Mar. 3, 2015

(54) TOUCH PANEL HAVING DEFORMABLE ELECTROACTIVE POLYMER ACTUATOR

(75) Inventors: Jong-oh Kwon, Suwon-si (KR); Seung-Tae Choi, Hwaseong-si (KR); Seong-Taek Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 13/050,550

(22) Filed: Mar. 17, 2011

(65) Prior Publication Data

US 2012/0086651 A1 Apr. 12, 2012

(30) Foreign Application Priority Data

Oct. 11, 2010 (KR) .................. 10-2010-0098961

(51) Int. Cl.
*G06F 3/041* (2006.01)
*G06F 3/01* (2006.01)
*G06F 3/045* (2006.01)

(52) U.S. Cl.
CPC .............. *G06F 3/016* (2013.01); *G06F 3/041* (2013.01); *G06F 3/045* (2013.01)
USPC ........................................................ 345/173

(58) Field of Classification Search
USPC ........................................................ 345/173
See application file for complete search history.

(56) References Cited

U.S. PATENT DOCUMENTS

| | | | |
|---|---|---|---|
| 4,923,057 A | 5/1990 | Carlson et al. | |
| 4,963,417 A | 10/1990 | Taniguchi et al. | |
| 5,055,840 A | 10/1991 | Bartlett | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |
| 7,051,292 B2 | 5/2006 | Nagase | |
| 7,067,756 B2 | 6/2006 | Cok | |
| 7,131,073 B2 | 10/2006 | Rosenberg et al. | |
| 7,196,688 B2 | 3/2007 | Schena | |
| 7,202,837 B2 | 4/2007 | Ihara | |

(Continued)

FOREIGN PATENT DOCUMENTS

| | | |
|---|---|---|
| CN | 1678978 A | 10/2005 |
| CN | 1829951 A | 9/2006 |

(Continued)

OTHER PUBLICATIONS

Extended European search report dated Oct. 7, 2010 issued by the European Patent Office in counterpart European Application No. 10166013.2.

(Continued)

*Primary Examiner* — Long D Pham
(74) *Attorney, Agent, or Firm* — Sughrue Mion, PLLC

(57) ABSTRACT

A touch panel is provided. The touch panel includes an electroactive polymer (EAP) actuator which is deformable when protruded or depressed locally at a part to which a driving voltage is applied; and a flexible touch sensor which is disposed on the EAP actuator. The flexible touch sensor is deformable locally in correspondence with a deformation of the EAP actuator, and senses an input according to a contact or pressing operation.

15 Claims, 16 Drawing Sheets

(56) References Cited

U.S. PATENT DOCUMENTS

| | | |
|---|---|---|
| 7,268,770 B1 | 9/2007 | Takahata et al. |
| 7,339,572 B2 | 3/2008 | Schena |
| 7,342,573 B2 | 3/2008 | Ryynaenen et al. |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 | 1/2013 | Heubel et al. |
| 8,493,131 B2 | 7/2013 | Mo et al. |
| 8,581,866 B2 | 11/2013 | Park et al. |
| 2001/0026636 A1* | 10/2001 | Mainguet .................... 382/124 |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 | 1/2003 | Andrade |
| 2004/0090426 A1 | 5/2004 | Bourdelais et al. |
| 2005/0057528 A1* | 3/2005 | Kleen .......................... 345/173 |
| 2005/0076824 A1* | 4/2005 | Cross et al. .................. 116/205 |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0097991 A1 | 5/2006 | Hotelling et al. |
| 2006/0099808 A1 | 5/2006 | Kondo |
| 2006/0103634 A1 | 5/2006 | Kim et al. |
| 2006/0119589 A1 | 6/2006 | Rosenberg et al. |
| 2007/0080951 A1 | 4/2007 | Maruyama et al. |
| 2007/0152974 A1 | 7/2007 | Kim et al. |
| 2007/0152982 A1 | 7/2007 | Kim et al. |
| 2007/0182718 A1 | 8/2007 | Schoener et al. |
| 2007/0211032 A1 | 9/2007 | Ahn et al. |
| 2007/0229464 A1 | 10/2007 | Hotelling et al. |
| 2008/0007815 A1 | 1/2008 | Liang et al. |
| 2008/0024459 A1 | 1/2008 | Poupyrev et al. |
| 2008/0024461 A1* | 1/2008 | Richter et al. ............... 345/173 |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1* | 11/2008 | Kwon et al. .................. 310/309 |
| 2009/0002199 A1* | 1/2009 | Lainonen et al. ............... 341/20 |
| 2009/0002328 A1 | 1/2009 | Ullrich et al. |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0250267 A1* | 10/2009 | Heubel et al. ............. 178/18.03 |
| 2009/0308737 A1 | 12/2009 | Kudoh |
| 2010/0024573 A1 | 2/2010 | Daverman et al. |
| 2010/0026654 A1 | 2/2010 | Suddreth |
| 2010/0026655 A1 | 2/2010 | Harley |
| 2010/0059295 A1 | 3/2010 | Hotelling et al. |
| 2010/0060610 A1 | 3/2010 | Wu |
| 2010/0149108 A1 | 6/2010 | Hotelling et al. |
| 2010/0156829 A1 | 6/2010 | Shimodaira |
| 2010/0177050 A1 | 7/2010 | Heubel et al. |
| 2010/0214232 A1 | 8/2010 | Chan et al. |
| 2010/0244858 A1 | 9/2010 | Cormier, Jr. |
| 2010/0259485 A1 | 10/2010 | Chuang |
| 2010/0321330 A1 | 12/2010 | Lim et al. |
| 2010/0321335 A1 | 12/2010 | Lim et al. |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227862 A1 | 9/2011 | Lim |
| 2011/0279374 A1 | 11/2011 | Park et al. |
| 2012/0019467 A1 | 1/2012 | Hotelling et al. |
| 2012/0038563 A1 | 2/2012 | Park et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| CN | 101046720 A | 10/2007 |
| CN | 101510008 A | 8/2009 |
| CN | 101840296 A | 9/2010 |
| EP | 1 544 720 A1 | 6/2005 |
| EP | 2 026 178 A1 | 2/2009 |
| EP | 2 141 569 A2 | 1/2010 |
| EP | 2 079 052 B1 | 3/2011 |
| JP | 6-34940 A | 2/1994 |
| JP | 09-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-236550 A | 8/2002 |
| JP | 2002-342035 A | 11/2002 |
| JP | 2004-71765 A | 3/2004 |
| JP | 2004-362428 A | 12/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2010-016969 A | 1/2010 |
| JP | 2010-079882 A | 4/2010 |
| JP | 2010-108505 A | 5/2010 |
| JP | 2011-3177 A | 1/2011 |
| JP | 2012-500089 A | 1/2012 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 02/089038 A2 | 11/2002 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |
| WO | 2009/002605 A1 | 12/2008 |
| WO | 2010105705 A1 | 9/2010 |

OTHER PUBLICATIONS

US Advisory Action, dated Apr. 26, 2013, issued in U.S. Appl. No. 12/849,310.

(56) References Cited

OTHER PUBLICATIONS

Final US Office Action, dated Dec. 20, 2012, issued in U.S. Appl. No. 12/849,310.
Non-Final US Office Action, dated Aug. 28, 2012, issued in U.S. Appl. No. 12/849,310.
Final US Office Action, dated Mar. 27, 2013, issued in U.S. Appl. No. 12/948,479.
Non-Final US Office Action, dated Oct. 15, 2012, issued in U.S. Appl. No. 12/948,479.
Non-Final US Office Action, dated Feb. 1, 2013, issued in U.S. Appl. No. 13/103,221.
Non-Final US Election Requirement, dated Apr. 10, 2013, issued in U.S. Appl. No. 13/097,937.
European Communication, dated Mar. 19, 2013, issued in European Application No. 11150285.2.
Non-Final US Office Action, dated May 7, 2013, issued in U.S. Appl. No. 12/719,281.
Non-Final US Office Action, dated Mar. 15, 2013, issued in U.S. Appl. No. 12/889,800.
Communication, dated Mar. 4, 2014, issued by the Japanese Patent Office in counterpart Japanese Patent Application No. 2010-133879.
Notice of Allowance, dated Mar. 28, 2014, issued in related U.S. Appl. No. 12/849,310.
Final US Office Action, dated Apr. 3, 2014, issued in related U.S. Appl. No. 12/889,800.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.
Final US Office Action dated Nov. 22, 2013 issued in U.S. Appl. No. 12/849,310.
Non-Final US Office Action dated Jun. 20, 2013, issued in U.S. Appl. No. 12/780,996.
Non-Final US Office Action dated Jul. 8, 2013, issued in U.S. Appl. No. 12/849,310.
Non-Final US Office Action dated Aug. 16, 2013, issued in U.S. Appl. No. 12/889,800.
Non-Final US Office Action dated Jul. 17, 2013, issued in U.S. Appl. No. 13/097,937.
Non-Final US Office Action dated Dec. 6, 2013, issued in U.S. Appl. No. 13/190,120.
Non-Final US Office Action dated Aug. 12, 2013, issued in U.S. Appl. No. 13/224,422.
US Notice of Allowance dated Sep. 19, 2013, issued in U.S. Appl. No. 12/719,281.
US Notice of Allowance dated Oct. 25, 2013, issued in U.S. Appl. No. 12/780,996.
Chinese Office Action dated Oct. 10, 2013, issued in a corresponding Chinese Patent Application No. 201010200349.1.
Non-Final US Office Action dated Feb. 10, 2014, issued in U.S. Appl. No. 12/719,281.
US Notice of Allowance dated Jan. 22, 2014, issued in U.S. Appl. No. 12/780,996.
Communication issued Oct. 16, 2014, by the European Patent Office in related Application No. 11186005.2.
Communication issued Oct. 29, 2014, by the State Intellectual Property Office of P.R. China in related Application No. 201010280797.7.
Communication issued Sep. 30, 2014, by the Japanese Patent Office in related Application No. 2010-265704.
Communication issued Oct. 8, 2014, by the State Intellectual Property Office of P.R. China in related Application No. 201010609836.3.

* cited by examiner

TOUCH PANEL HAVING DEFORMABLE ELECTROACTIVE POLYMER ACTUATOR

CROSS-REFERENCE TO RELATED APPLICATION

This application claims priority from Korean Patent Application No. 10-2010-0098961, filed Oct. 11, 2010, the entire disclosure of which is incorporated herein by reference for all purposes.

BACKGROUND

1. Field

The following description relates to a user interface, and more particularly, to a touch panel.

2. Description of the Related Art

A touch panel is one example of a kind of user input device used to determine whether a user generates an input and the position of the user's input by sensing the user's contact thereon. A user may input data or signals to a touch panel by contacting or pressing a surface of the touch panel with a finger, a stylus pen or the like. The touch panel may be used as a touch pad functioning as a substitute for a mouse in a laptop computer or a netbook, etc., or used in place of an input switch of an electronic device. Also, the touch panel may be used in association with a display. A touch panel which is mounted on the screen of a display device, such as a liquid crystal display (LCD), a plasma display panel (PDP), a cathode ray tube (CRT) and the like, is generally called a "touch screen". A touch panel may be integrated with a display device to configure the screen of the display or may be attached additionally on the screen of the display.

In certain situations, a touch panel may be substituted for a user input device such as a keyboard, a trackball, or a mouse, and also may allow for simple manipulations. Moreover, the touch panel can provide users with various types of buttons according to the types of applications to be executed or stages of the executed application. Accordingly, a touch panel, and more specifically, a touch screen, has been used as an input device for electronic equipment, such as a mobile phone, a personal digital assistant (PDA), a portable multimedia player (PMP), a digital camera, a portable game, a Moving Picture Experts Group Layer-3 (MP3) player, etc., as well as an automated teller machine (ATM), an information trader, a ticket vending machine, etc.

A touch panel can be classified into a resistive type, a capacitive type, a saw type, an infrared type, etc., according to methods of sensing user's inputs. A capacitive type touch panel determines whether a user generates an input and the position of the user's input by measuring variations in capacitance due to contact or pressure. However, the capacitive type touch panel fails to offer users a sense of input, that is, a feeling of recognition that a user gets upon inputting. In order to overcome this disadvantage, a method of installing a vibration motor under a touch panel has been proposed. The method offers users a sense of input by vibrating the whole touch panel using the vibration motor when a user's contact is sensed. Recently, a method of offering various senses of inputs by adjusting the magnitude or frequency of vibration has been developed.

SUMMARY

One or more embodiments relate to a touch panel that can output various signals which a user can recognize through tactile sense according to the kinds or stages of applications and/or the user's selection.

One or more embodiments also relate to a touch panel which allows a user to recognize an input button through tactile sense.

According to an aspect of an embodiment, there is provided a touch panel including an electroactive polymer (EAP) actuator which is deformable when protruded or depressed locally at a part to which a driving voltage is applied; and a flexible touch sensor which is disposed on the EAP actuator, is deformable locally in correspondence with a deformation of the EAP actuator, and senses an input according to a contact or pressing operating.

According to an aspect of another embodiment, there is provided a touch panel including a multi-layered electroactive polymer (EAP) actuator body including a plurality of polymer thin films that are formed with EAP and have a stacked structure, and a plurality of driving electrodes disposed between each of the polymer thin films; a flexible touch sensor which is disposed on the multi-layered EAP actuator body, and which includes a piezoelectric layer formed from a piezoelectric polymer, and a plurality of sensing electrodes formed on the piezoelectric layer, wherein current generated when the piezoelectric layer is pressed flows through the sensing electrodes; a driving unit electrically connected to the driving electrodes and applying a driving voltage to the driving electrodes to form an electric field locally in the polymer thin films; and a sensing unit electrically connected to the sensing electrodes and sensing current flowing through the sensing electrodes to detect an input location at which the piezoelectric layer is pressed.

Other features and aspects will be apparent from the following detailed description, the drawings, and the claims.

BRIEF DESCRIPTION OF THE DRAWINGS

The above and/or other aspects will be more apparent from the following detailed description taken with reference to the accompanying drawings, in which.

DETAILED DESCRIPTION

Figure 1:
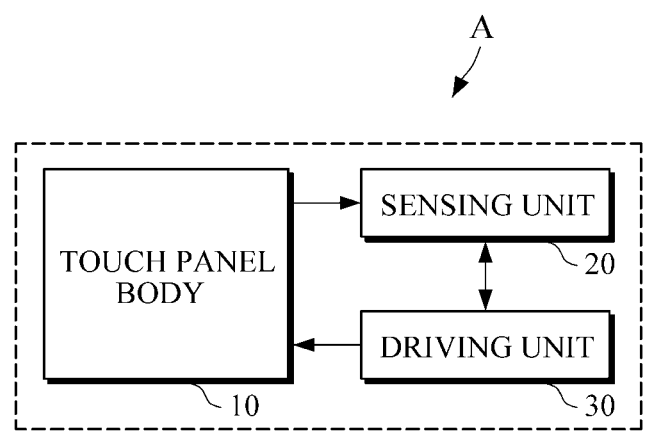
FIG. 1 is a diagram illustrating an example of a touch panel according to an embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. The meanings of terms used in the following examples follow given definitions, and terms not explicitly defined in the specification should be interpreted using meanings that are known to those skilled in the art. For example, the meaning that a first material layer is formed on a second material layer includes the case in which a third material layer is inserted between the first and second material layers, if no description excluding the case is given, as well as the case where the first material layer is formed directly on the second material layer.

Throughout the drawings and the detailed description, unless otherwise described, the same drawing reference numerals will be understood to refer to the same elements, features, and structures. The relative size and depiction of these elements may be exaggerated for clarity, illustration, and convenience.

In this description, a touch panel is one example of a user input device, and may be included in various kinds of electronic devices. For example, the touch panel may be used as a user input device for various kinds of home and office appliances, as well as a touch pad for a notebook, a netbook, etc. Also, the touch panel may be mounted on the display of an electronic device and used as a touch screen. For example, a touch panel, specifically, a touch screen has been widely used as an input device for electronic equipment, such as a mobile phone, a PDA, a PMP, an E-book terminal, etc., as well as an ATM, an information trader, a ticket vending machine, etc.

Also, a touch panel may be mounted on the surface of an electronic device and used as an input/output device. For example, a touch panel may be used as input buttons (for example, navigation keys) of a mobile phone or a mobile multimedia player, or may provide various output signals (for example, letters, figures, simple symbols such as arrows) which a user can recognize through tactile sense. The input buttons or output signals may depend on a user's selection and/or the kinds or stages of applications. For this, a touch panel may include an actuator allowing local deformation, and a flexible sensor that may be deformable in correspondence to deformation of the actuator. The actuator and flexible sensor will be described in detail later.

FIG. 1 is a diagram illustrating an example of a touch panel A according to an embodiment.

Referring to FIG. 1, the touch panel A includes a touch panel body 10, a sensing unit 20, and a driving unit 30. The touch panel body 10 indicates a physical structure of the touch panel A. The sensing unit 20 and the driving unit 30 may be electrical circuits and/or hardware/software which senses an input onto the touch panel body 10, drives the touch panel body 10, and controls the operation of the touch panel body 10. The term "touch panel" used in the following description may be used to indicate only the touch panel body 10 in a narrow sense, or may be used in a broad sense to indicate the whole touch panel A including the sensing unit 20 and driving unit 30.

In FIG. 1, the sensing unit 20 and the driving unit 30 are shown as separate units depending on logical classification according to their functions. However, alternatively, they may be integrated into a single unit. Also, the logical function classification of the sensing unit 20 and the driving unit 30 is also for convenience of description, and any other integrated component may perform all functions that can be performed by the sensing unit 20 and the driving unit 30, or some functions that are performed by any one of the sensing unit 20 and the driving unit 30 may be performed by the other one. Also, the touch panel A may further include a controller (not shown) which controls the operation of the sensing unit 20 and the driving unit 30. Moreover, the functionality of the sensing unit 20 and the driving unit 30 may be performed by at least one central processing unit (CPU) of a computer. Hereinafter, the structure and operation of the touch panel body 10 will be described.

Figure 2:
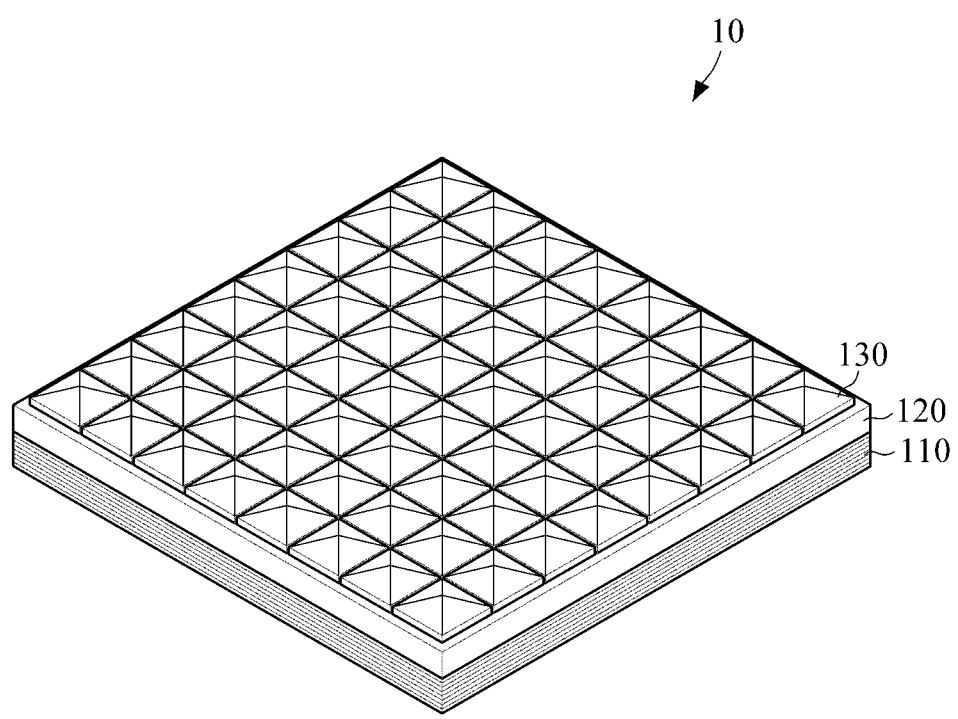
FIG. 2 illustrates a touch panel body of the touch panel illustrated in FIG. 1.

FIG. 2 is a perspective view illustrating a schematic structure of the touch panel body 10. In FIG. 2, the touch panel body 10 is shown to have a square shape. However, this is only exemplary. That is, the shape of the touch panel body 10 may be variously shaped, and the shape may depend on the kind or installation position of an electronic device on which the touch panel A (see FIG. 1) is mounted, and/or the purpose of the touch panel A. Referring to FIG. 2, the touch panel body 10 may include an actuator body 110, a sensor body 120, and a bumpy member 130.

The actuator body 110 indicates the physical structure of an actuator which is deformed when protruded or depressed locally at areas to which driving voltages have been applied. For example, the actuator may be made of electro-active polymer (EAP) or piezoelectric ceramic that is a high molecule material deformable by electrical stimuli, and may be deformed locally at areas where driving voltages are applied to form an electric field. Since an EAP actuator, whose deformation rate is maximally 5%, has a higher deformation rate than other actuators (for example, a piezoelectric ceramic actuator has a deformation rate of maximally 0.2%), the EAP actuator may cause a relatively great displacement even when the EAP actuator is fabricated with a small size.

The EAP actuator generally causes a displacement of several % under an electric field of about 20 to about 150 V/µm. Accordingly, in order to obtain a great displacement (for example, a displacement of about 3 to about 7%) from an EAP actuator made of polymer having the thickness of about 10 µm, a driving voltage from about 200 to about 1500 V is needed. Such a high driving voltage makes application of an existing EAP actuator to an electronic device such as a mobile device which tends to require a relatively low driving voltage (for example, below 24V) difficult. Korean Patent Application No. 2008-0100757 entitled "Electroactive Actuator and Fabrication Method thereof", filed and laid-open by the same applicant, proposes a multi-layered EAP actuator as a method for reducing a driving voltage of an EAP actuator.

A multi-layered EAP actuator is formed by stacking a plurality of thin polymer films and arranging driving electrodes between the polymer films, wherein opposite voltages are applied to both sides of each polymer film. The actuator body 110 may be a multi-layered EAP actuator body that is formed by stacking a plurality of unit layers each layer including an EAP thin film made of electroactive polymer and driving electrodes formed on the EAP thin film. Specifically, the multi-layered EAP actuator body 110 may have a structure where two types of unit layers are alternately stacked, the two types of unit layers constructing a pair of unit layers, in order to alternately apply different voltages to the driving voltages of the respective unit layers.

Figure 3A:
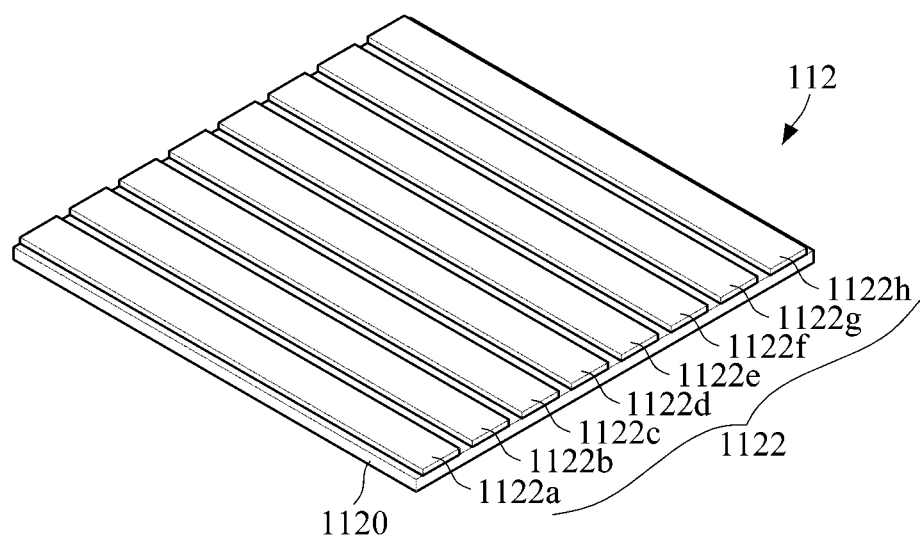
FIGS. 3A and 3B are perspective views illustrating two types of unit layers included in an electro-active polymer (EAP) actuator body of FIG. 2.
Figure 3B:
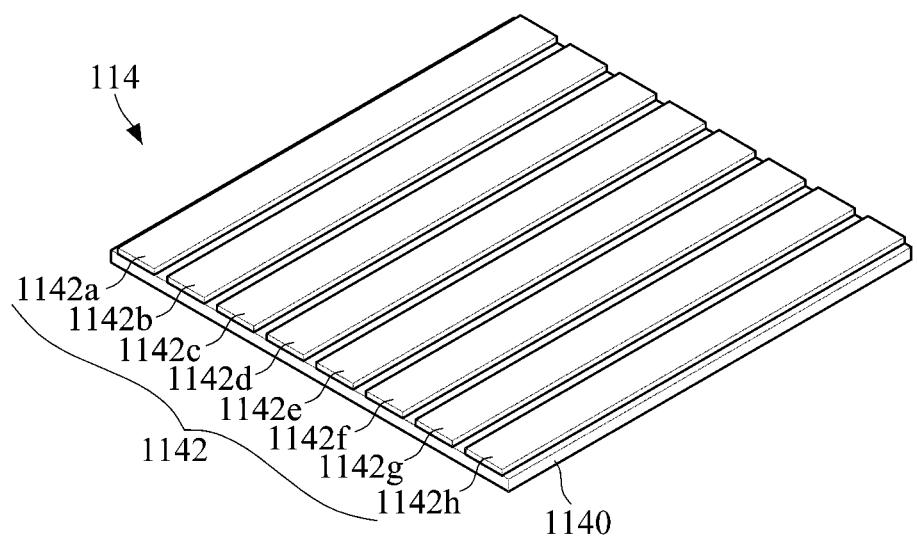

FIGS. 3A and 3B are perspective views illustrating the two types of unit layers included in the EAP actuator body 110. For example, when it is assumed that the multi-layered EAP actuator body 110 has a structure where ten unit layers are stacked, the odd-numbered layers (that is, the first, third, fifth, seventh, and ninth layers) of the ten unit layers may each have a structure 112 (hereinafter referred to as a "first unit layer") illustrated in FIG. 3A, and the even-numbered layers (that is, the second, fourth, sixth, eighth, and tenth layers) may each have a structure 114 (hereinafter referred to as a "second unit layer") illustrated in FIG. 3B. Alternatively, it is also possible that the odd-numbered layers (that is, the first, third, fifth, seventh, and ninth layers) of the ten unit layers each is the second unit layer 114, and the even-numbered layers (that is, the second, fourth, sixth, eighth, and tenth layers) each is the first unit layer 112.

Referring to FIGS. 3A and 3B, the first unit layer 112 includes a first polymer thin film 1120 and a plurality of first driving electrodes 1122 formed on a surface of the first polymer thin film 1120, and the second unit layer 114 includes a second polymer thin film 1140 and a plurality of second driving electrodes 1142 formed on a surface of the second polymer thin film 1140. Also, the first and second driving electrodes 1122 and 1142 include a plurality of electrode lines 1122a though 1122h, and 1142a through 1142h, respectively, as shown in FIGS. 3A and 3B. The electrode lines 1142a through 1142h (hereinafter, referred to as second electrode lines) of the second driving electrodes 1142 extend perpendicular to the electrode lines 1122a through 1122h (hereinafter, referred to as first electrode lines) of the first driving electrodes 1122.

The first and second polymer thin films 1120 and 1140 may be made of a dielectric polymer material which is deformable by electrical stimuli. For example, the first and second polymer thin films 1120 and 1140 may be formed with silicon (or polyurethane) dielectric elastomers, ferro-electric polymer such as Poly VinyliDene Fluoride (PVDF) polymer or Poly(VinyliDene Fluoride-TriFluorEtylene) (P(VDF-TrFE)) polymer, or relaxor ferro-electric polymer such as Poly(VinyliDene Fluoride-TriFluoroEthylene-CloroTriFluoroEthylene (P(VDF-TrEE-CFE) polymer or Poly(VinyliDene Fluoride-TriFluoroEthylene-CloroTriFluoroEthylene (P(VDF-TrFE-CFTE) polymer. The first and second polymer thin films 1120 and 1140 made of such dielectric polymer may have a thin thickness of about 2 μm or less.

The P(VDF-TrFE-CFTE) polymer and P(VDF-TrFE-CFE) polymer among the above-mentioned dielectric polymers have a property that the polymer contracts in the direction in which a voltage is applied but stretches in the direction perpendicular to the direction in which the voltage is applied. Also, the P(VDF-TrFE-CFTE) polymer and P(VDF-TrFE-CFE) polymer show a greatest displacement (maximally about 4%) with respect to a low driving voltage (for example, about 100V or less) among the above-mentioned dielectric polymers. Furthermore, the P(VDF-TrFE-CFTE) polymer and P(VDF-TrFE-CFE) polymer improve, after they are crosslinked, a thermal resistance (about 200° C. or more), increase a driving displacement, and also show high visible light transmission of about 90% or more. Accordingly, the first and second polymer thin films 1120 and 1140 formed with crosslinked P(VDF-TrFE-CFTE) or P(VDF-TrFE-CFE) polymer can be applied to a wider variety of applications.

The first and second driving electrodes 1122 and 1142 may be formed with a flexible, conductive material which is deformable in correspondence to local deformation of the polymer thin films 1120 and 1140. For example, the first and second driving electrodes 1122 and 1142 may be formed with transparent, conductive polymer, such as polyaniline, polypyrrole, PEDOT [Poly(3,4-EthyleneDiOxyThiophene)]:PSS [Poly(4-StyreneSulfonic acid)]], polythiophen, etc.

Since the EAP actuator body 110 is formed by stacking a plurality of unit layer pairs each pair including a first unit layer 112 and a second unit layer 114 placed on the first unit layer 112, driving electrodes are defined in a matrix form at intersections of the first and second electrode lines 1122a through 1122h and 1142a through 1142h that are arranged perpendicular to each other, as illustrated in FIGS. 3A and 3B. That is, the EAP actuator body 110 includes driving electrodes arranged in a matrix form. When the driving electrodes arranged in a matrix form are electrically connected to be individually driven, the EAP actuator body 110 may be deformed to display a shape, such as a letter, a figure, a simple symbol, etc.

Figure 4:
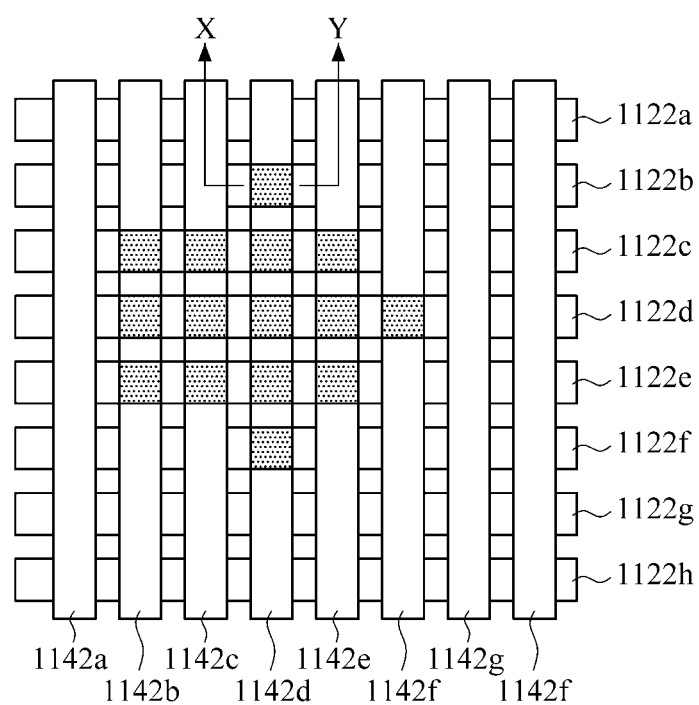
FIG. 4 is a plan view illustrating an example of a shape that is displayed using driving electrodes arranged in a matrix form.
Figure 5:
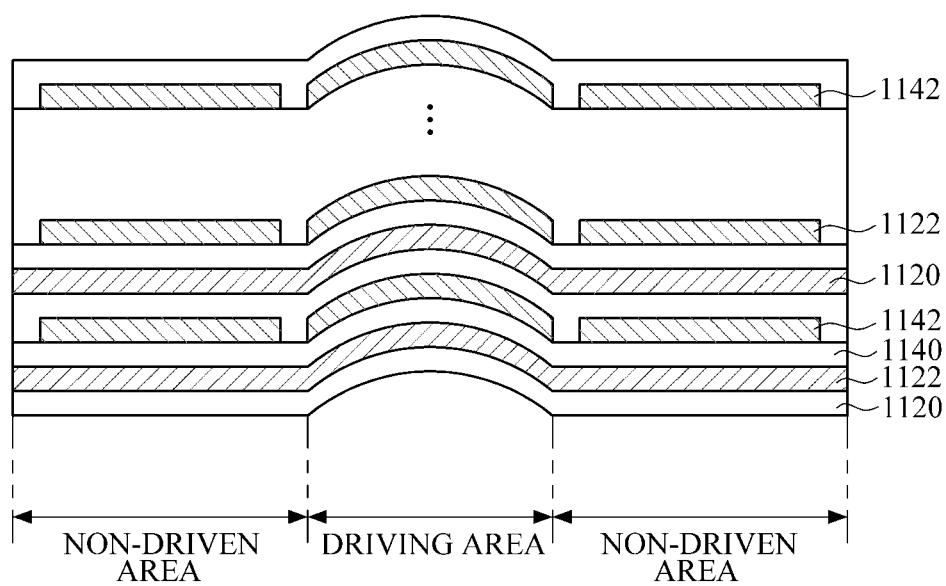
FIG. 5 is a cross-sectional view cut along a X-Y line of FIG. 4.

FIG. 4 is a plan view illustrating an example of a shape that is displayed using the driving electrodes arranged in a matrix form, and FIG. 5 is a cross-sectional view cut along a X-Y line of FIG. 4. FIG. 4 corresponds to the case where driving voltages are applied only to 15 driving electrodes among total of 64 driving electrodes to display a right directional arrow. Also, FIG. 5 shows the case where a driving area is protruded upward. Alternatively, it is also possible that a driving area is depressed downward. Referring to FIGS. 4 and 5, areas to which driving voltages are applied, that is, polymer thin films 1120 and 1140 corresponding to driving areas, are deformed to be protruded upward, whereas areas to which no driving voltage is applied, that is, polymer thin films 1120 and 1140 corresponding to non-driven areas, are not deformed. Accordingly, by appropriately combining driving areas through application of driving voltages, the EAP actuator body 110 may be deformed to display a shape, such as a letter, a figure, a simple symbol, etc.

As such, in order for the EAP actuator body 110 to be locally deformed, the first or second driving electrodes 1122 and 1142 may be formed in a pattern on the first and second polymer thin films 1120 and 1140, respectively. For example, as illustrated in FIGS. 3A and 3B, when the first and second driving electrodes 1122 and 1142 are defined by the first and second electrode lines 1122a through 1122h and 1142a through 1142h, respectively, that extend perpendicular to each other, the EAP actuator body 110 is deformable.

In more detail, when driving voltages are applied to a part of the first and second driving electrodes 1122 and 1142 arranged in a matrix form, that is, when opposite voltages are respectively applied to a part of the first electrode lines 1122a through 1122h and the corresponding part of the second electrode lines 114a through 1142h, an electric field is formed at intersections of the first electrode lines 1122a through 1122h and the second electrode lines 1142a through 1142h to which the voltages have been applied. As a result, only polymer thin films 1120 and 1140 corresponding to driving areas where the electric field is formed are deformed to be protruded or depressed, and polymer thin films 1120 and 1140 corresponding to non-driven areas where no electric field is formed are not deformed, so that the EAP actuator body 110 is locally deformed.

However, in this case, since on/off is selected in units of an electrode line, not in units of a driving electrode at each intersection, there are difficulties in deforming the EAP actuator body 110 to various shapes. For example, the deformed area of the EAP actuator body 110, when it is simultaneously driven, cannot have the right directional arrow shape illustrated in FIG. 4.

The patterns of the first and second driving electrodes 1122 and 1142 as illustrated in FIGS. 3A and 3B are only exemplary. For example, in the case where the EAP actuator body 110 has driving electrodes arranged in a matrix form, the first and second driving electrodes 1122 and 1142 may be respectively formed with different patterns on the polymer thin films 1120 and 1140. For example, a plurality of square electrode pads each having a unit cell size may be formed in a matrix form on each of the polymer thin films 1120 and 1140. In this case, a driving voltage is applied to each electrode pad to locally deform the EAP actuator body 110. That is, by appropriately combining and selecting electrode pads to which the driving voltage will be applied, the EAP actuator body 110 may be deformed to display a shape, such as a letter, a figure, a symbol (for example, the arrow shape illustrated in FIG. 4), etc.

In order to apply driving voltages to the individual electrode pads, electrode pads on each unit layer are provided with terminals. For example, when the electrode pads are arranged in the form of an 8×8 matrix, at least 128 terminals are used. However, it is difficult to dispose a large number of terminals in the small-sized actuator body 110, and also, rearrangement of terminals to connect the individual terminals to a controller becomes increasingly challenging as the number of electrode pads increases, which results in complicated wirings and makes a fabrication process more difficult.

Meanwhile, defining driving electrodes at intersections of the first electrode lines 1122a through 1122h and the second electrode lines 1142a through 1142h, as illustrated in FIGS. 3A and 3B, may significantly reduce the number of terminals. In more detail, when eight first electrode lines 1122a through 1122h and eight second electrode lines 1142a through 1142h are arranged, only sixteen terminals are used to apply driving voltages to all the first electrode lines 1122a through 1122h and the second electrode lines 1142a through 1142h. However, in this case, as described above, the EAP actuator body 110 may be deformed to show only several limited shapes.

A method of deforming the EAP actuator body 100 which has a structure where a pair of unit layer are stacked, that permits more various shapes is to sequentially apply driving voltages to all or a part selected from among the first electrode lines 1122a through 1122h and all or a part selected from among the second electrode lines 1142a through 1142h for a predetermined time period. At this time, a pattern of driving voltages that are sequentially applied for the predetermined time period may be periodically repeated. The predetermined time period may be decided based on a time interval for which a user can sense deformation through tactile sense to recognize an output signal. For example, a predetermined pattern of driving voltages may be applied repeatedly with a cycle of about $\frac{1}{100}$ to about 1 second. In this case, the predetermined pattern of applied driving voltages will be repeated once every 100 times per second.

Figure 6A:
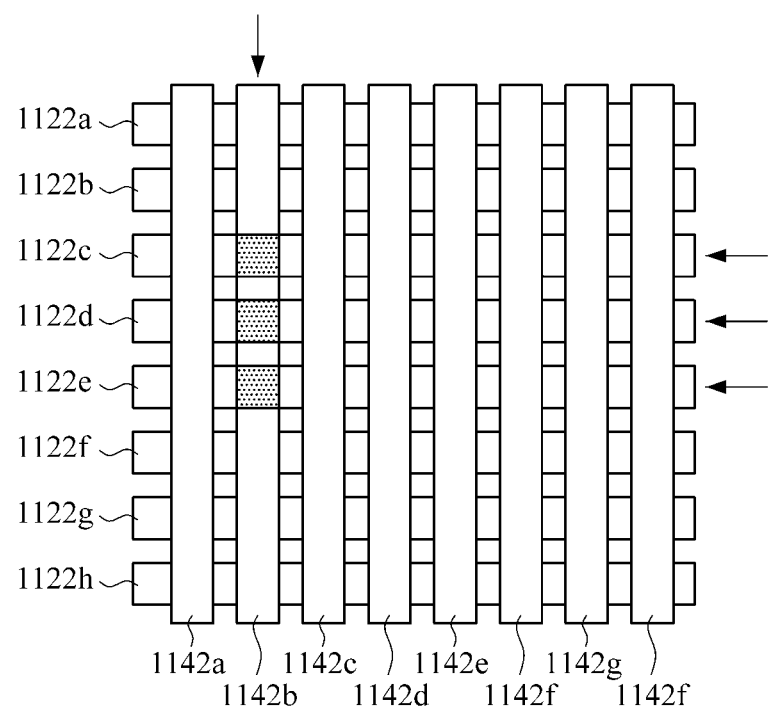
FIGS. 6A through 6E are views for explaining an example of a method of sequentially outputting signals to display the shape illustrated in FIG. 4 using an EAP actuator body including a structure in which a pair of unit layers illustrated in FIGS. 3A and 3B are stacked.
Figure 6B:
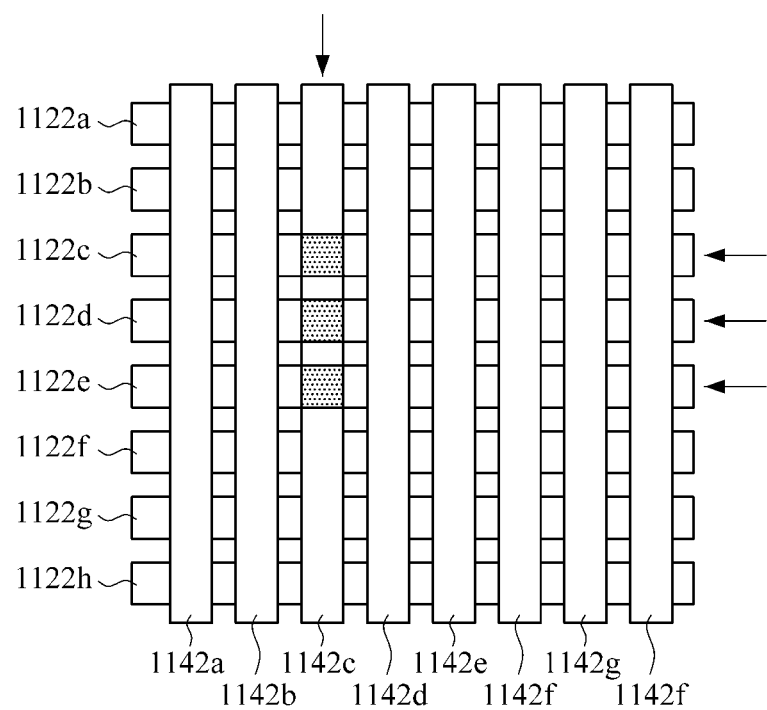
Figure 6C:
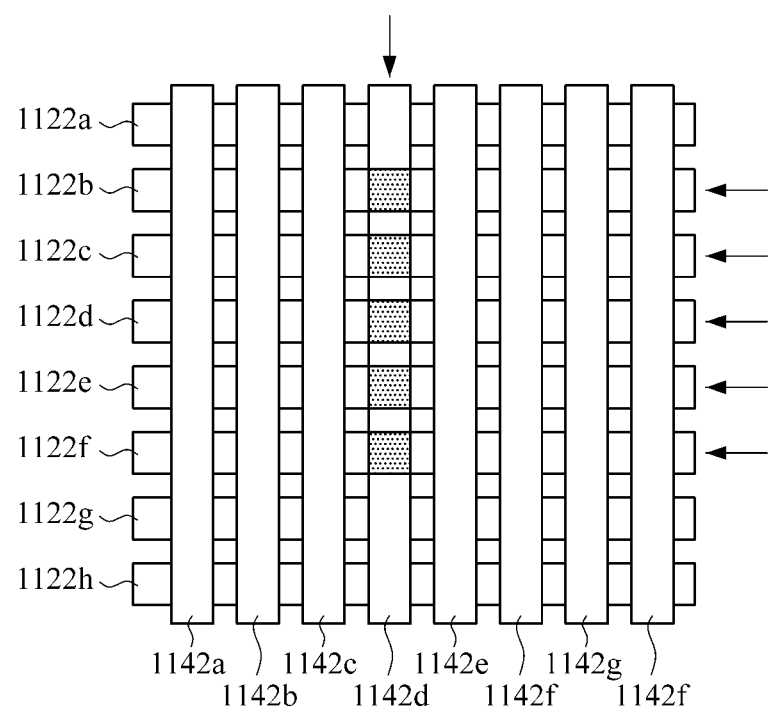
Figure 6D:
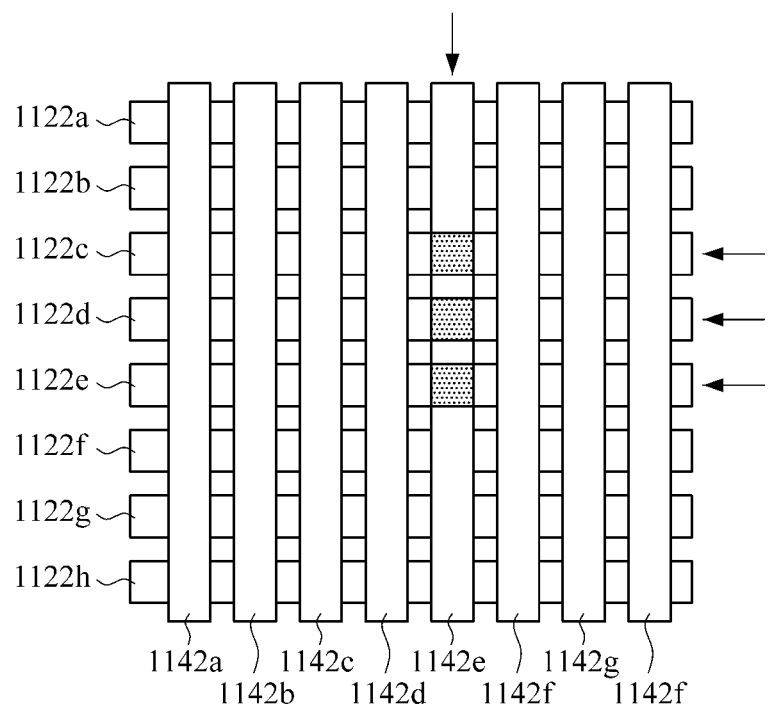
Figure 6E:
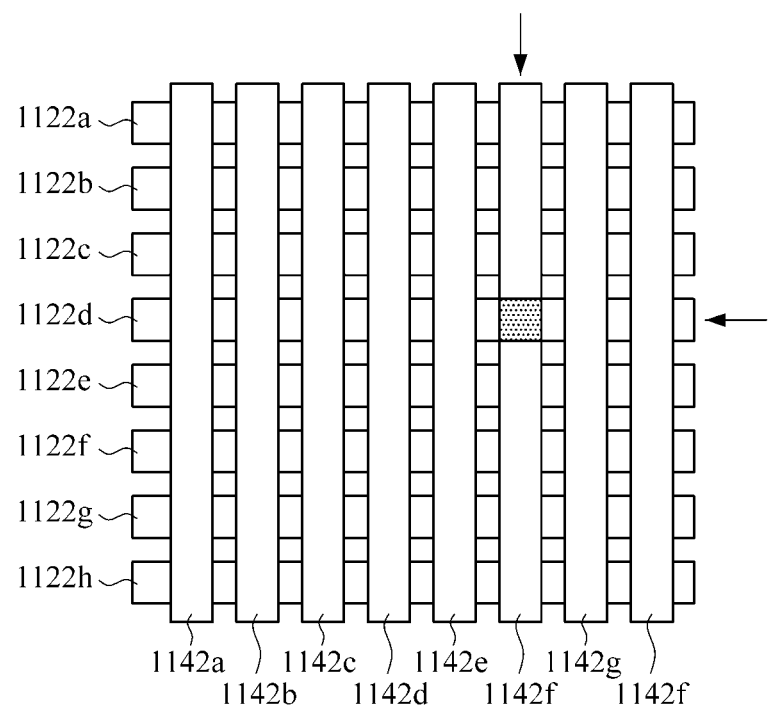

FIGS. 6A through 6E are views for explaining an example of a method of sequentially outputting signals to display the shape illustrated in FIG. 4 using the EAP actuator body including the structure to which a pair of unit layers illustrated in FIGS. 3A and 3B is stacked. Referring to FIG. 6A, at a first timing, driving voltages are applied to three first electrode lines 1122c, 1122d and 1122e and one second electrode line 1142b. As a result, the driving voltages are applied to an area corresponding to the most left vertical line 1142b of the arrow illustrated in FIG. 4 and the corresponding area is deformed. Then, referring to FIG. 6B, at a second timing, the driving voltages are applied to three first electrode lines 1122c, 1122d, and 1122e and one second electrode line 1142c. As a result, the driving voltages are applied to an area corresponding to the second left vertical line 1142c of the arrow illustrated in FIG. 4 and the corresponding area is deformed. Then, referring to FIG. 6C, at a third timing, the driving voltages are applied to five first electrode lines 1122b, 1122c, 1122d, 1122e and 1122f and one second electrode line 1142d. As a result, the driving voltages are applied to an area corresponding to the third left vertical line 1142d of the arrow illustrated in FIG. 4 and the corresponding area is deformed. Next, referring to FIG. 6D, at a fourth timing, the driving voltages are applied to three first electrode lines 1122c, 1122d, and 1122e and one second electrode line 1142e. As a result, the driving voltages are applied to an area corresponding to the fourth left vertical line 1142e of the arrow illustrated in FIG. 4 and the corresponding area is deformed. Finally, referring to FIG. 6E, at a fifth timing, the driving voltages are applied to one first electrode line 1122d and one second electrode line 1142f. As a result, the driving voltages are applied to an area corresponding to the fifth left vertical line 1142f of the arrow illustrated in FIG. 4 and the corresponding area is deformed. The method of applying the driving voltages, as shown in FIGS. 6A through 6E, may be repeated once per a predetermined time period, for example, every $\frac{1}{100}$ to 1 second.

When the driving voltages are applied as shown in FIGS. 6A through 6E, the user may recognize the shape (that is, the arrow shape) of the protruded area for a predetermined time period through tactile sense. Particularly, a signal such as an arrow may be output by sequentially applying driving voltages whose output timings are adjusted in the same direction which the arrow indicates. Also, when application of the driving voltages is periodically repeated, the user can exactly recognize what output signal is output through tactile sense.

Referring again to FIG. 2, the touch panel body 10 includes a sensor body 120 disposed on the EAP actuator body 110. An insulative layer (not shown) for electrical isolation may be inserted between the EAP actuator body 110 and the sensor body 120. The insulative layer may be made of a material such as silicon oxide or silicon nitride having an excellent insulation property and capable of being manufactured as a thin film.

The sensor body 120 generates an input signal when a contact or pressing operation occurs. The sensor body 120 may be a capacitive type touch panel, a resistive type touch panel, a piezoelectric type touch panel, etc. The sensor body 120 includes a flexible touch sensor made of a material that is locally deformable in correspondence to local deformation of the EAP actuator body 110. The touch sensor is flexible to allow for the sensor body 120 to be deformed in correspondence to deformation of the EAP actuator body 110 so that a user can sense deformation of the touch panel body 10 through tactile sense.

For example, the sensor body 120 may include a piezoelectric layer which generates current when a surface of the sensor body 120 is pressed and is formed with piezoelectric polymer having flexibility, and a plurality of sensing electrodes through which the current generated by the piezoelectric layer can flow. The piezoelectric polymer may be Poly(ViynyliDene Fluoride-TriFluoroEthylene) P(VDF-TrFE) polymer. The P(VDF-TrFE) polymer is a high molecular material having a piezoelectric property and can convert mechanical energy into electrical energy. The P(VDF-TrFE) polymer may be used to manufacture a sensor which senses a pressure or contact.

The sensing electrodes also may be made of a conductive, flexible material which is deformable in correspondence to local deformation of the piezoelectric layer. For example, the sensing electrodes may be, like the driving electrodes described above, formed with transparent, conductive polymer, such as polyaniline, polypyrrole, PEDOT [Poly(3,4-EthyleneDiOxyThiophene)]:PSS [Poly(4-StyreneSulfonic acid)]], polythiophen, etc. The shape of the sensing electrodes is matrix-shaped arrangement of square pads, or a plurality of electrode lines arranged on the upper and lower surfaces of the piezoelectric layer in such a manner as to cross perpendicular to each other, like the pattern of the driving electrodes described above.

The bumpy member 130 may be disposed on the sensor body 120. The bumpy member 130 has a structure whose surface is in a concavo-convex pattern to improve a tactile sense with respect to the surface. Since the EAP actuator body 110 can cause a greater displacement rather than other actuator bodies but has a small size of about several micrometers, the user can more sensitively and accurately sense deformation of the EAP actuator body 110 and sensor body 120 from the concave-convex surface of the bumpy member 130 than from a flat surface.

Figure 7A:
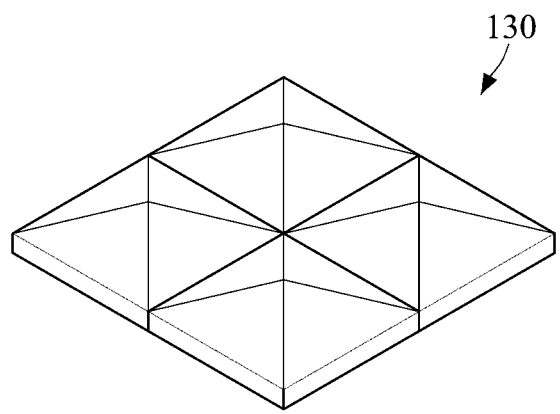
FIGS. 7A and 7B are a perspective view and a cross-sectional view showing a bumpy member of FIG. 2.
Figure 7B:
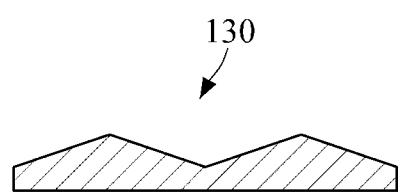

The concavo-convex shape or size of the bumpy member 130 is not limited. For example, the bumpy member 130 may include a plurality of unit bumpy members each having a pyramid shape as illustrated in FIGS. 7A and 7B. In this case, each pyramid structure is disposed in correspondence to a cell, that is, a driving electrode, or a plurality of pyramid structures are arranged in the form of a matrix (for example, a 2×2 matrix in the example of FIGS. 7A and 7B). Alternatively, the concavo-convex structure formed in the bumpy member 130 may be a structure where a plurality of concave, fine lines and a plurality of convex, fine lines (for example, lying trigonal prisms) are arranged or a structure where one or more pillars (for example, cylinders or hexagon pillars) are protruded in correspondence to each cell.

Thus, in other words, the bumpy member 130 may be locally deformable in correspondence to deformation of the sensor body 120, that is, in correspondence to deformation of the EAP actuator body 110. This local deformability allows a user to recognize deformation of the EAP actuator body 110 through tactile sense, like the sensor body 120 which is formed with a flexible material.

For this, the bumpy member 130 may be made of a flexible material such as polymer. In this case, however, since the bumpy member 130 has low rigidity, the bumpy member 130 is easy to be damaged when it is repeatedly used, and particularly, the concave-convex structure for improving a tactile sense is easy to be damaged.

It may be advantageous for the bumpy member 130 to perform a function of protecting the EAP actuator body 110 and the sensor body 120 that are positioned below the bumpy member 130. As described above, since the EAP actuator body 110 and the sensor body 120 are made of a material (for example, polymer) having a flexible property, repeatedly contacting the surface of the EAP actuator body 110 or sensor body 120 with a finger, or a stylus pen, etc. may damage the EAP actuator body 110 or sensor body 120. Thus, the bumpy member 130 may act as a protective member for preventing the surfaces of the EAP actuator body 110 and the sensor body 120, particularly, the surface of the sensor body 120 from being damaged.

In order to perform a protective function, the bumpy member 130 may be formed with a material (for example, plastic or metal, etc.) having sufficient rigidity for preventing a surface of the bumpy member 130 from being damaged. However, in the case where the bumpy member 130 is formed with sheet-shaped plastic or metal having the same size as the sensor body 120 disposed below the bumpy member 130, it becomes more difficult to deform the bumpy member 130 in correspondence to the deformation of the sensor body 120.

Thus, the current embodiment allows local deformation of the bumpy member 130 by forming the bumpy member 130 having a structure where a plurality of unit bumpy members whose upper surfaces have a concave-convex shape are separated and arranged in a matrix form, as shown, for example, in FIG. 7A. The size of each unit bumpy member may be equal to or smaller than the size of each driving electrode cell. Accordingly, it is also possible that a plurality of unit bumpy members are disposed in correspondence to a driving electrode cell.

Figure 8:
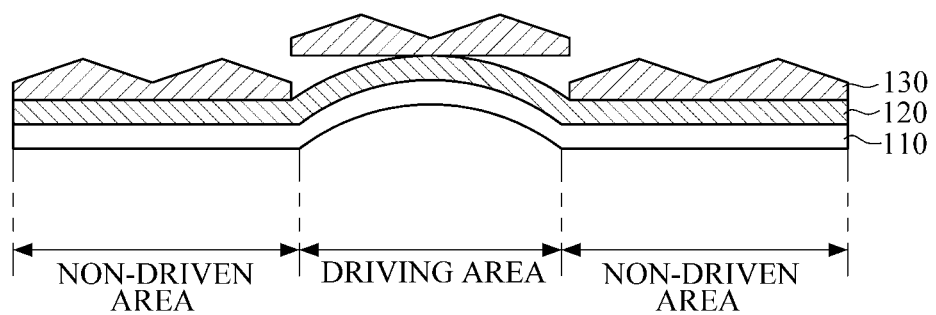
FIG. 8 is a cross-sectional view for explaining a driving state of a touch panel including the bumpy member of FIG. 7B.

FIG. 8 is a cross-sectional view for explaining a driving state of a touch panel including the bumpy member 130. Referring to FIG. 8, the bumpy member 130 includes a plurality of unit bumpy members that are separated and arranged in a matrix form on the sensor body 120 such that the unit bumpy members can move individually. Unit bumpy members positioned in correspondence to driving areas are protruded upward according to deformation of the EAP actuator body 110 and the sensor body 120, and unit bumpy members positioned in correspondence to non-driven areas do not move upon deformation of the EAP actuator body 110 and the sensor body 120.

Referring again to FIGS. 1 and 2, the sensing unit 20 determines whether a user input onto the touch panel A, in more detail, onto the touch panel body 10 occurs, and detects the location of the user input when the user input occurs. For detecting a user input location, the sensing unit 20 may electrically connect to sensing electrodes of the touch panel body 10. If the touch panel body 10 is a piezoelectric type, the sensing unit 20 determines whether current flows through the sensing electrodes to determine whether a user input occurs. Then, information about occurrence of user input and the user input location, determined by the sensing unit 20, may be transferred to the driving unit 30.

The driving unit 30 applies a driving voltage to the touch panel A, specifically, to the EAP actuator body 110 to locally deform the EAP actuator body 110. That is, the driving unit 30 selects the number and/or locations of driving electrodes to which a driving voltage will be applied to apply the driving voltage only to the selected driving electrodes. For this, the driving unit 30 may electrically connect to the driving electrodes of the EAP actuator body 110. The driving unit 30 may apply various patterns of driving voltages according to a selection from a user and/or the stage of an application of an electronic device in which the touch panel A is installed. For example, an application pattern of driving voltages includes a method of driving the EAP actuator body 110 as described above with reference to FIGS. 6A through 6E. Also, the driving unit 30 may apply, when receiving an input signal including an input location from the sensing unit 20, a predetermined pattern of driving voltages based on the input location.

Figure 9A:
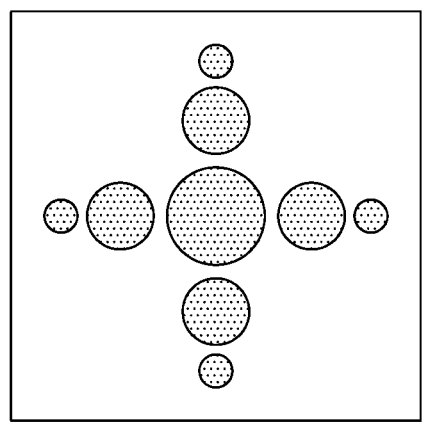
FIGS. 9A and 9B illustrate examples of touch panels according to other embodiments.
Figure 9B:
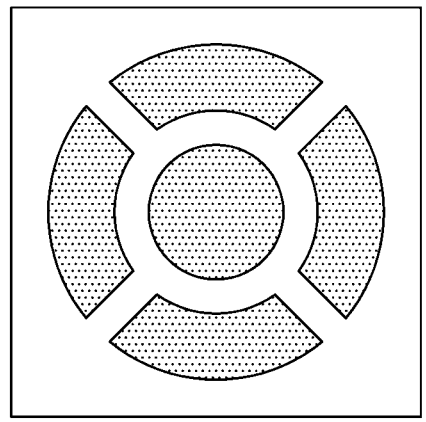

FIGS. 9A and 9B illustrate examples of touch panels. The touch panels illustrated in FIGS. 9A and 9B may have the same structure as the touch panel illustrated in FIGS. 1 and 2, and accordingly detailed descriptions therefor will be omitted. Shaded areas in FIGS. 9A and 9B represent areas deformed by application of driving voltages. For example, in each of the touch panels, driving voltages may be applied only to shaded areas, and for this, the touch panel, in more detail, the EAP actuator body, may be disposed only in parts corresponding to the shaded areas. That is, instead of a structure where square electrode pads or line-type electrode lines are arranged on the surface of a polymer thin film, electrode pads having the shapes of the shaded areas may be arranged on a polymer thin film. Accordingly, the touch panels illustrated in FIGS. 9A and 9B will be deformed to the patterns of electrode pads corresponding to the shaded areas when driving voltages are applied. The touch panels may use the shaded areas as various input buttons. For example, input buttons having the shapes illustrated in FIGS. 9A and 9B may be used as navigation keys for a mobile phone or a mobile multimedia player, etc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A touch panel comprising:
an electroactive polymer (EAP) actuator which is deformable when protruded or depressed locally at a part to which a driving voltage is applied;
a flexible touch sensor which is disposed on the EAP actuator, is deformable locally in correspondence with a deformation of the EAP actuator, and senses an input according to a contact or pressing operation; and
a bumpy member disposed on the flexible touch sensor and formed of plastic or metal, the bumpy member being deformable locally in correspondence with a deformation of the flexible touch sensor,
wherein the bumpy member comprises a plurality of unit bumpy members that are separated and arranged in a matrix form,
wherein the EAP actuator comprises a plurality of layers which are stacked together to form a multi-layered EAP actuator, each layer of the plurality of layers comprising:
a polymer thin film formed from an electro-active polymer (EPA); and
a plurality of driving electrodes which are formed on a surface of the polymer thin film, and are configured to apply driving voltages to the polymer thin film, and
wherein the EAP actuator is deformed in the same direction as the plurality of layers are stacked in layers.

2. The touch panel of claim 1, wherein the polymer thin film comprises a crosslinked Poly(VinyliDene Fluoride-TriFluoroEthylene-ChloroTriFluoroEthylene) (P(VDF-TrFE-CTFE)) polymer or a crosslinked Poly(VinyliDene Fluoride-TriFluoroEthylene-ChloroFluoroEthylene) (P(VDF-TrFE-CFE)) polymer.

3. The touch panel of claim 1, wherein the driving electrodes are comprise polypyrrole, polyaniline, or polythiophen.

4. The touch panel of claim 1, wherein the flexible touch sensor comprises:
a piezoelectric layer comprising a piezoelectric polymer; and
a plurality of sensing electrodes which are formed on the piezoelectric layer, and through which current generated when a surface of the piezoelectric layer is deformed flows.

5. The touch panel of claim 4, wherein the piezoelectric layer comprises a Poly(VinyliDene Fluoride-TriFluoroEtylene) (P(VDF-TrFE)) polymer.

6. The touch panel of claim 4, wherein the sensing electrodes comprises polypyrrole, polyaniline, or polythiophen.

7. The touch panel of claim 1, wherein the plurality of unit bumpy members have upper surfaces with a concavo-convex structure.

8. A touch panel comprising:
a multi-layered electroactive polymer (EAP) actuator body comprising a plurality of polymer thin films that are formed with EAP and have a stacked structure, and a plurality of driving electrodes disposed between each of the polymer thin films;
a flexible touch sensor which is disposed on the multi-layered EAP actuator body, and comprises a piezoelectric layer formed from a piezoelectric polymer, and a plurality of sensing electrodes formed on the piezoelectric layer, wherein current generated when the piezoelectric layer is pressed flows through the sensing electrodes;
a bumpy member disposed on the flexible touch sensor and formed of plastic or metal, the bumpy member being deformable locally in correspondence with a deformation of the flexible touch sensor;
a driving unit which is electrically connected to the driving electrodes and applies a driving voltage to the driving electrodes to form an electric field locally in the polymer thin films; and
a sensing unit which is electrically connected to the sensing electrodes and senses current flowing through the sensing electrodes to detect an input location at which the piezoelectric layer is pressed,
wherein the bumpy member comprises a plurality of unit bumpy members that are separated and arranged in a matrix form,
wherein the multi-layered EAP actuator body comprises a plurality of unit layers having a stacked structure, and each of the unit layers comprises:
a first polymer thin film formed from an EAP;
a first driving electrode including a plurality of first electrode lines which are formed on the first polymer thin film and extend in a first direction;
a second polymer thin film which is formed from an EAP and is formed on the first polymer thin film on which the first driving electrode is formed; and
a second driving electrode comprising a plurality of second electrode lines which are formed on the second polymer thin film and extend in a second direction perpendicular to the first direction,
wherein the driving unit applies different driving voltages to the first driving electrode and the second driving electrode, respectively, so that the first and second driving electrodes have opposite voltages, and
wherein the EAP actuator is deformed in the same direction as the plurality of layers are stacked in layers.

9. The touch panel of claim 8, wherein the plurality of driving electrodes are arranged in a matrix form on each of the polymer thin films, and the driving unit applies the driving voltage to a part of the driving electrodes arranged in the matrix form.

10. The touch panel of claim 8, wherein the driving unit applies the driving voltage to all of the plurality of first electrode lines or to a part of the first electrode lines selected from among the plurality of first electrode lines, and to all of the plurality of second electrode lines or to a part of the second electrode lines selected from among the plurality of second electrode lines.

11. The touch panel of claim 10, wherein the driving unit sequentially applies the driving voltage to all or the selected part of the first electrode lines, and to all or the selected part of the second electrode lines, for a predetermined time period.

12. The touch panel of claim 11, wherein the predetermined time period is within a range of about 1/100 to about 1 second.

13. The touch panel of claim 8, wherein the plurality of unit bumpy members have upper surfaces with a concavo-convex structure.

14. The touch panel of claim 8, wherein the plurality of driving electrodes are arranged in a predetermined pattern on each of the polymer thin films.

15. The touch panel of claim 14, wherein when the driving unit applies the driving voltage to the driving electrodes, the flexible touch sensor functions as an input button at an area corresponding to the predetermined pattern.

* * * * *